United States Patent
Wardman et al.

(10) Patent No.: US 10,885,180 B2
(45) Date of Patent: Jan. 5, 2021

(54) DETECTION OF EMULATED COMPUTER SYSTEMS USING VARIABLE DIFFICULTY CHALLENGES

(71) Applicant: PayPal, Inc., San Jose, CA (US)

(72) Inventors: Bradley Wardman, Phoenix, AZ (US); Blake Butler, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 83 days.

(21) Appl. No.: 16/231,083

(22) Filed: Dec. 21, 2018

(65) Prior Publication Data

US 2020/0201981 A1 Jun. 25, 2020

(51) Int. Cl.
G06F 21/44 (2013.01)
H04L 29/06 (2006.01)

(52) U.S. Cl.
CPC ............ *G06F 21/44* (2013.01); *H04L 63/102* (2013.01); *G06F 2221/2103* (2013.01)

(58) Field of Classification Search
CPC . G06F 21/44; G06F 2221/2103; H04L 63/102
See application file for complete search history.

(56) References Cited

U.S. PATENT DOCUMENTS

| | | | |
|---|---|---|---|
| 8,181,253 B1* | 5/2012 | Zaitsev | G06F 21/552 713/152 |
| 10,084,786 B2 | 9/2018 | Ashiya et al. | |
| 10,091,312 B1 | 10/2018 | Khanwalkar et al. | |
| 2006/0031338 A1* | 2/2006 | Kang | G06Q 20/3674 709/206 |
| 2009/0193496 A1 | 7/2009 | Lakshminarayanan et al. | |
| 2011/0029781 A1* | 2/2011 | Clark | G06F 21/31 713/182 |
| 2011/0225569 A1 | 9/2011 | Beaty et al. | |

(Continued)

OTHER PUBLICATIONS

Longe et al., Checking Internet masquerading using multiple CAPTCHA challenge-response systems, Jan. 2009, 2nd International Conference on Adaptive Science & Technology, pp. 244-249 (Year: 2009).*

(Continued)

*Primary Examiner* — Kenneth W Chang
(74) *Attorney, Agent, or Firm* — Kowert, Hood, Munyon, Rankin & Goetzel, P.C.

(57) ABSTRACT

Techniques are disclosed relating to detecting that a client system is an emulated computer system based on its computational performance of one or more challenge problems. In some embodiments, a server computer system may receive, from a client system, a request to access a web service. The server computer system may determine reported technical features of the client system and select a particular challenge problem to provide to the client system. The server computer system may determine an expected response time of the particular challenge problem for the client system. The server computer system may receive a challenge response from the client system that includes a proposed solution to the particular challenge problem. The server computer system may then determine whether to authorize the request based on a measured response time by the client system and the expected response time of the particular challenge problem for the client system.

19 Claims, 7 Drawing Sheets

(56) References Cited

U.S. PATENT DOCUMENTS

| | | | |
|---|---|---|---|
| 2011/0231913 A1* | 9/2011 | Feng | H04L 9/3271 |
| | | | 726/7 |
| 2012/0072968 A1 | 3/2012 | Wysopal et al. | |
| 2012/0174095 A1 | 7/2012 | Natchadalingam et al. | |
| 2014/0026220 A1* | 1/2014 | Gehrig, Jr. | G06F 21/44 |
| | | | 726/23 |
| 2014/0289833 A1 | 9/2014 | Briceno et al. | |
| 2015/0135316 A1* | 5/2015 | Tock | G06F 21/56 |
| | | | 726/23 |
| 2015/0150084 A1 | 5/2015 | Kiperberg et al. | |
| 2016/0285858 A1 | 9/2016 | Li et al. | |
| 2017/0070517 A1 | 3/2017 | Bailey et al. | |
| 2017/0235951 A1 | 8/2017 | Harrison et al. | |
| 2018/0139215 A1 | 5/2018 | Neuvirth-Telem et al. | |
| 2019/0007412 A1 | 1/2019 | Ram | |
| 2019/0207821 A1 | 7/2019 | Perkal et al. | |

OTHER PUBLICATIONS

International Search Report and Written Opinion in Appl. No. PCT/US2019/066814 dated Apr. 7, 2020, 10 pages.

Franklin, et al., "Remote Detection of Virtual Machine Monitors with Fuzzy Benchmarking," ACM SIGOPS Operating Systems Review, vol. 42 Issue 3, Apr. 2008, pp. 83-92.

FDIC, Identifying and Mitigating Cyber Fraud, Federal Deposit Insurance Corporation Division of Risk Management Supervision Atlanta Regional Office, Jun. 27, 2013, 28 pages.

Kang, "Defences against fingerprinting," Browserprint.info, posted Aug. 5, 2016, https://browserprint.info/blog/fingerprinting/Defence, 5 pages.

Nguyen Anh Quynh, "Operating System Fingerprinting for Virtual Machines," 2018, 9 pages.

\* cited by examiner

DETECTION OF EMULATED COMPUTER SYSTEMS USING VARIABLE DIFFICULTY CHALLENGES

BACKGROUND

Technical Field

This disclosure relates generally to computer system security, and more particularly to detecting emulated computer systems based on computational performance.

Description of the Related Art

Server computer systems, such as web servers, application servers, email servers, etc., may provide various computing resources and services to an end user. For example, a web service may use a computer system to provide access to software applications to remote users via a network. A web service will commonly limit access to its resources and services to only those users with a valid user account with the service. One method for limiting access to a web service is to require an end user to establish a user account and authentication credentials (e.g., a username and password), and to require end users to provide valid credentials to the server computer system prior to gaining access to the service.

In some instances, however, such user credentials may be discovered by a malicious third-party (e.g., through a phishing attack, brute-force attack, etc.), presenting security concerns. Once authenticated, the malicious third-party may access the web service, including the various functionalities and features accessible to the user account, to the same extent as the authorized user. Applicant recognizes that preventing and mitigating effects of such unauthorized access is desirable for improving computer system security and functionality.

DETAILED DESCRIPTION

Figure 1:
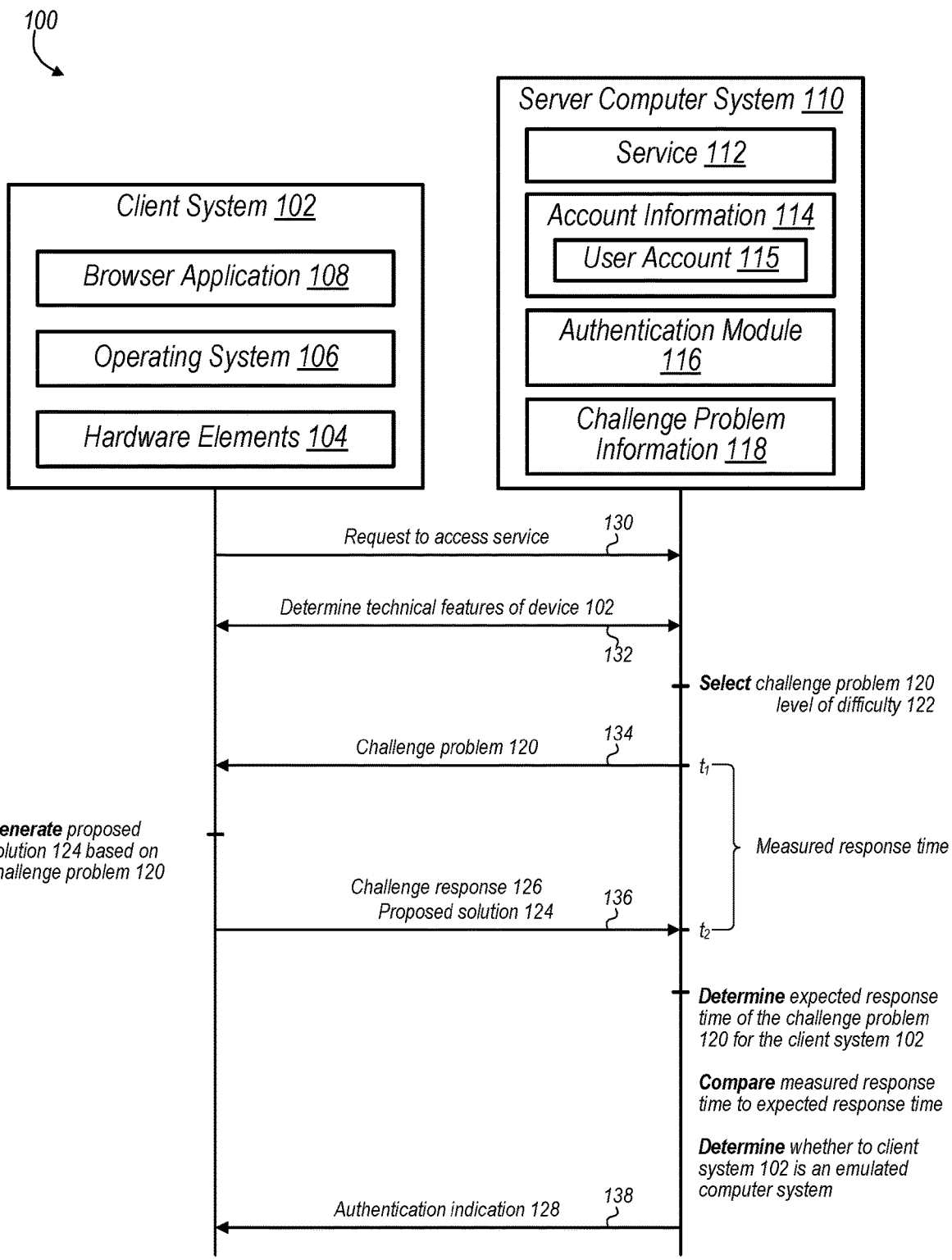
FIG. 1 is a communication diagram illustrating an example exchange between a server computer system and a client system to determine whether the client system is an emulated computer system based on its computational performance, according to some embodiments.

Server computer systems implement various techniques in an effort to limit unauthorized access to computing services. (Broadly, a server system may refer to any computer system that provides data or a service.) One common technique is to require a requesting user to provide authentication credentials that may be validated (e.g., by the server computer system or a separate authentication server) prior to providing the user with access to a user account. Once authenticated, a user may be authorized to perform various operations associated with the user account.

The nature of the user's access will vary depending on the type of service at-issue. For example, in the case of an email service, an authenticated user may be authorized to access previously sent and received emails, send new emails from the user account, etc. If, for example, a web service enables a user to perform financial transactions (e.g., a service associated with a bank or online payment system), the user may be authorized to perform various financial operations, such as transferring money, accessing financial information, etc.

In some instances, however, reliance on authentication credentials may present security concerns. For example, in the event that a user's authentication credentials are compromised, a malicious third-party may access the user account to the same extent as the valid user. Continuing with the previous example, discovery of a user's authentication credentials for an online payment system may enable the malicious user to transfer money, access financial information, etc. to the same extent as the valid user. This poses major security concerns.

Various efforts have been made to prevent malicious third-parties from accessing web service using stolen authentication credentials. For example, some web services utilize "device fingerprinting" as part of their authentication process. As will be appreciated by one of skill in the art, device fingerprinting may refer to the process of collecting information about a remote client system being used to access a web page or other resource, such as the type and version of web browser being used, browser extensions installed, system platform, time zone of the system, amount of physical memory, cache size, physical screen display size, and other characteristics. When a server receives a request to access the service, the requesting user may be authenticated on the basis of both the authentication credentials provided and the technical features of the device being used to send the access request. If the technical features of the requesting client system do not match the "device fingerprint" stored by the server computer system, the service may detect this discrepancy and take appropriate actions, such as denying access to the service, requiring additional authentication factors to be provided, etc.

The use of device fingerprinting in user authentication may also suffer from various shortcomings, however. For example, in addition to obtaining a valid user's authentication credentials, a malicious third-party may also obtain information about technical features of the valid user's system. With knowledge of both a valid user's authentication credentials and the technical features of the valid user's computer system, a malicious third-party may be able to satisfy such a device fingerprint assessment and access the valid user's account with the web service.

For example, malicious third-parties will often use emulated computer systems when attempting to improperly access a valid user's account. As used herein, the term "emulated computer system" refers to software that is being executed on a physical computer system and that emulate a computer system. (An emulated computer system may also be implemented in hardware or as a combination of hardware and software, in some embodiments.) Examples of emulated computer systems include virtual machines ("VMs"), emulators, and the like. Note that, in various embodiments, an emulated computer system may be created and configured to emulate any of various types of computer systems, such as personal computers, mobile computing devices (e.g., smartphones, tablet computers, smart-watches, etc.), Internet of things ("IoT") devices (e.g., industrial or consumer appliances), etc. In some instances, the emulated computer system may be considered a "guest" system and the physical computer system on which it is executing may be considered a "host" system. In some embodiments, one or more technical features (such as the operating system ("OS"), installed software, available hardware resources, etc.) of the emulated guest computer system and the physical host computer system may differ. For example, it is common for malicious third-parties to use emulated computer systems because such systems can be configured to resemble the computer system of the valid user, allowing the malicious third-party to circumvent device fingerprint assessments by the server computer system. Additionally, note that the use of such emulated computer systems may allow a malicious third-party to scale their account takeover attacks by instantiating multiple instances of an emulated computer system on a single physical computer system. Thus, the use of an emulated computer system is typically an indicator that the access request is higher risk and should be subject to a higher level of scrutiny before providing access to the service.

As one non-limiting example, consider an instance in which a valid user typically uses a computer running the Windows 10™ operating system and the Firefox™ web browser to access her user account with a particular web service. Once a malicious third-party learns this, they may create a VM that uses the Windows 10™ operating system and the Firefox™ web browser to match the technical features of the user's system. When the malicious third-party then attempts to access the valid user's account using this VM, a provider service may be unable to easily detect that the access request is coming from a device other than the valid user's known computer system, allowing the malicious user to defeat the device fingerprinting assessment and improperly access the valid user's account. For example, if the malicious actor did not emulate the legitimate user's system features but instead used, e.g., a Linux operating system and the Opera™ web browser, it might be more readily apparent to a service provider that this is an unknown system (e.g. not known to have been previously used by the valid user), which might increase risk of detection or security measures. In many contexts, use of an emulated system is suspicious, and thus may increase security protocols, for example.

In various embodiments, however, the disclosed systems and methods may solve these and other technical problems by enabling a computer system (e.g. a server system) to detect whether a client system is an emulated computer system based on its computational performance. As used herein, the term "client system" refers to the entity from which an access request originates. In some instances, the client system may be an emulated computer system, such as a VM. In other instances, however, the client system may be a physical computer system. Various embodiments of the present disclosure involve determining the status of the client system as either an emulated computer system or a physical computer system (e.g. a non-emulated system). For example, in some embodiments, when a server computer system receives, from a client system, a request to access a web service, the server computer system may determine (e.g., through device fingerprinting) apparent or reported technical features of the client system. (Note that the technical features gleaned by the server computer system through device fingerprinting may be considered "apparent" or "reported" since, in the event that the client system is an emulated computer system, these observed technical features may not directly correspond to the actual technical features of the physical host machine used by the requesting user.)

The server computer system may then select a particular challenge problem to be solved by the client system before it is authenticated to the service. As described in more detail below, the challenge problem may be associated with a particular level of difficulty and may include a puzzle, calculation, game, simulation, or other computational task for the client system to perform. Once the requesting client system receives the challenge problem, it may generate a proposed solution and send that to the server computer system. The server computer system may then determine whether the client system is an emulated computer system based on the client system's performance of the challenge problem. Thus, the present techniques notably do not simply attempt to require that a client system simply execute a specified number of particular executable instructions, in various embodiments, but may select specific challenges geared to the apparent capabilities of a system and that may be expected to execute within a particular time interval (e.g. some variation in execution time may occur).

For example, in various embodiments, the server computer system may compare the client system's response time to an expected response time for the particular challenge problem, given the problem's level of difficulty and the reported technical features of the client system. If there is a discrepancy between the measured response time and the expected response time (e.g., the client system performed the challenge problem much more quickly than it feasibly could, given its reported technical features or the challenge problem's difficulty), the server computer system may determine that the client system is likely an emulated computer system and may take various actions (e.g., decline to authenticate the requesting user, require the requesting user to perform additional authentication procedures, etc.). Note, however, that this embodiment is provided merely as an example and, in other embodiments, various other aspects of the client system's performance of the challenge problem may be used to detect whether it is an emulated computer system. For example, in some embodiments, the server computer system may make such a determination based on whether the computational performance of the client system matches that of other client systems with similar technical features, the ability of the client system to utilize client-side cache in solving the challenge problem, whether the proposed solution matches the known solution for the challenge problem, etc.

Thus, in various embodiment, the disclosed systems and methods may be used to detect that an emulated computer system is being used to attempt to access a web service or any other service provided by a computer system. Stated differently, the disclosed systems and methods may be used to distinguish between emulated computer systems—which are commonly used to attempt account-takeover attacks—and physical client systems. Such physical client systems may also perform in such a way reflected a certain age of use—e.g., the system may be have been in use for months or years, which can impact response to created security challenges (e.g. certain files may be present, caches of web pages, memory, or other caches may be wholly or partially full with prior accessed data, etc.).

As explained in more detail below, such distinctions may be made, in various embodiments, by detecting discrepancies between the reported technical features of the client system and the client system's computational performance. Such discrepancies, in various embodiments, may indicate that the client system is an emulated computer system. Based on this information, the server computer system may take further precautionary measures, such as denying authentication or requiring additional authentication procedures, which may prevent attempted account takeovers that, using prior techniques, would have been successful. Thus, in various embodiments, the disclosed systems and methods may improve data security for both the web service and its users, thereby improving the functioning of the service as a whole.

Referring now to FIG. 1, a communication diagram illustrating an exchange 100 for detecting an emulated computer system based on its computational performance is shown, according to some embodiments. In the depicted embodiment, FIG. 1 includes client system 102 and server computer system 110. Note that, although shown in direct connection, client system 102 and server computer system 110 may be connected via one or more communication networks (not shown for clarity).

In various embodiments, server computer system 110 may host a web service 112 accessible to various remote users via one or more communication networks. For example, server computer system 110 may host an email service, streaming media service, an online payment service, or any other web service 112, according to various embodiments. In the depicted embodiment, server computer system 110 further includes (or has access to) account information 114 associated with various user accounts for web service 112. This account information 114 may include various items of information associated with the user accounts of the service 112, such as authentication credentials, access permissions, etc. As discussed in more detail below with reference to FIG. 2, the account information 114 may also include, for various user accounts, information about the devices used to access the user account (e.g., collected during previous sessions via device fingerprinting) and information about such devices' previous performance of challenge problems (e.g., completion times, success rate, etc.).

Server computer system 110 further includes authentication module 116, which, in various embodiments, is operable to detect whether the client system 102 is an emulated computer system and, based on this information, whether to authorize client system 102 to the web service 112. For example, in various embodiments, server computer system 110 may select one or more challenge problems for the client system 102 to solve, and authentication module 116 may determine whether to authenticate the client system 102 based on its performance on the selected challenge problem(s). Note that, in various embodiments, authentication module 116 may determine whether to authorize a requesting user of client system 102 based on various factors, such as multi-factor authentication, the perceived level of risk associated with the client system 102, whether the client system 102 is an emulated computer system, etc. Further note that, in some embodiments, the determination that a client system 102 is an emulated system may not, by itself, result in the requesting user being denied access to service 112. Instead, in some such embodiments, detection that the client system is an emulated computer system may instead trigger additional authentication operations to be performed.

FIG. 1 further includes client system 102, which is a remote computing system attempting to access service 112. Client system 102 may be either a physical computing system or an emulated computing system (e.g., a VM running on a physical host system, such as a PC or server). At 130, in the depicted embodiment, client system 102 sends a request to access user account 115 associated with the service 112. In various embodiments, this request may include authentication credentials for the account 115, and authentication module 116 may verify these credentials against stored credentials for account 115. If the provided credentials do not match the stored authentication credentials for the user account 115, server computer system 110 may take any of various suitable actions, such as denying access to the service 112. If, however, the provided credentials do match stored authentication credentials, server computer system 110 may take further action to determine whether the client system 102 is an emulated computer system.

At 132, in the depicted embodiment, server computer system 110 may determine various technical features associated with the client system 102. As noted above, such technical features may directly correspond to the actual features of system 102 or, in the event that system 102 is an emulated computer system, such technical features may simply be purported features of the system and may differ from the actual features of the underlying physical machine. In some embodiments, server computer system 110 may determine the reported technical features of the client system 102 using device fingerprinting techniques (e.g., by examining the information about client system 102 exposed in HTTP headers in the access request sent by the client system 102 at 130, by sending one or more scripts to client system 102 operable to expose various technical features, etc.). As discussed in more detail below with reference to FIG. 2, server computer system 110 may determine various different technical features associated with the client system 102, such as the browser 108 used, the operating system 106, and various aspects of the hardware elements 104.

In various embodiments, server computer system 110 includes (or has access to) challenge problem information 118, which includes information about various challenge problems that may be sent to the client system 102. As noted above, the challenge problems may include a computational task for the client system to perform, such as a puzzle, calculation, game, simulation, or any other suitable computational task. For example, in some non-limiting embodiments, the challenge problems may include computational tasks such as 15-puzzles, Boolean satisfiability problems, maximum satisfiability ("MAX-SAT") problems, various NP-easy or NP-hard problems, etc. In some embodiments, the challenge problem information 118 will include problems that are computationally difficult to solve, with easily verifiable solutions, such that it will take considerably longer for the client system 102 to solve the challenge problem (e.g., 2-3 seconds) than it takes for the server computer system 110 to verify the proposed solution to the challenge problem (e.g., 10 ms). Note that these times given are mere examples, and actual times may vary widely by embodiment (e.g. client times might range from fractions of a second to many seconds or even possibly minutes; server generation times may also vary). In various embodiments, server computer system 110 may select one or more challenge problems 120 to send to client system 102. As will be discussed in more detail below with reference to FIG. 2, server computer system 110 may select the challenge problem 120 based on the reported technical features of the client system 102. For example, in some embodiments, server computer system 110 may select a challenge problem 120 that has a level of difficulty 122 that is commensurate with the technical capabilities of client system 102, as indicated by the reported technical features. In some such embodiments, server computer system 110 may select the problem 120 such that the level of difficulty 122 increases as the reported technical capabilities of the client system 102 increase.

At 134, in the depicted embodiment, server computer system 110 provides the challenge problem 120, associated with a particular level of difficulty 122, to the client system 102. In various embodiments, challenge problem 120 may be provided to the client system 102 in the form of program code or scripts (e.g., in JavaScript or any other suitable language) that may be executed by the client system 102 (e.g., by browser application 108). In various embodiments, server computer system 110 may include the challenge problem in communication 134. In other embodiments, however, rather than actually including the challenge problem 120, communication 134 may instead include a reference to the challenge problem 120 that the client system 102 may use to retrieve the problem (e.g., a hyperlink to a web page from which client system 102 may obtain the challenge problem 120).

Once it receives the challenge problem 120, client system 102 may generate a proposed solution 124, for example by executing program code to solve the challenge problem 120. This program code may be provided to client system 102 or may be generated by client 102 in various embodiments. Client system 102 may then, at 136, send a challenge response 126, including the proposed solution 124, to the server computer system 110. In various embodiments, the form of the proposed solution 124 may vary depending on the nature of the challenge problem 120. For example, in embodiments in which challenge problem 120 is a Boolean satisfiability problem, proposed solution 124 may specify a truth-assignment for the variables involved. Note, however, that this embodiment is provided merely as an example and is not intended to limit the scope of the present disclosure.

In the depicted embodiment, the challenge problem 120 is sent to the client system 102 at a time $t_1$ and the challenge response 126 is received at a later time $t_2$. In various embodiments, the difference between these two points may be considered the measured response time, which may be used to determine whether the client system 102 is an emulated computer system. For example, server computer system 110 may determine an expected response time for the client system 102 to provide a proposed solution 124. In some embodiments, this expected response time may be based on the level of difficulty 122 of the challenge problem 120, the reported technical features of the client system 102, or both. For example, if the client system 102 is more technically advanced (e.g. relative to other known system configurations), server computer system 110 may determine the expected response time (e.g., 2500 ms) to be shorter than it would be if the client system 102 were less technically advanced (e.g., 5000 ms). Similarly, if the level of difficulty 122 is relatively high (indicating that challenge problem 120 is relatively computationally intensive), server computer system 110 may determine the expected response time to be longer than it would be if the level of difficulty 122 were lower. Note that, in various embodiments, the expected response time may also take into account latency associated with the network over which the client system 102 and the server computer system 110 are communicating. For example, in some embodiments, server computer system 110 may send one or more additional messages to the client system 102 (e.g., as part of a packet latency analysis) to measure the client system 102's response time having to solve any challenge problem, and may use this information to accommodate for network delays when determining the expected response time.

Note, however, that in some embodiments, server computer system 110 may measure the computational performance of the client system 102 in ways that are not dependent on the return time, which may be skewed by network latency. In some such embodiments, for example, rather than measure the response time of the challenge response 126, server computer system 110 may instead measure the progress made by the client system 102 on one or more challenge problems during an allotted timeframe. For example, server computer system 110 may give client system 102 a certain timeframe (e.g., three seconds, etc.) to work on a challenge problem 120, after which time the client system 102 provides (instead of or in addition to proposed solution 124) a progress value (e.g., 78%, 84%, etc.) indicating the amount of the challenge problem 120 it completed during the time allotted. In such embodiments, even if this progress value were delayed in transit, such latency would not skew the measurement of the client system 102's computational performance.

Having received the challenge response 126, server computer system 110 may compare the measured response time to the expected response time for the challenge problem 120. In some embodiments, this comparison may be used to determine whether it is likely that the client system 102 is an emulated computer system. For example, if there is a significant discrepancy between the expected and measured response times beyond a particular threshold (e.g., if the measured response time is above or below the expected response time by, for example, 10%, 20%, or any other suitable threshold), this may indicate that the purported technical features of the client system 102 do not match the actual technical features of the system 102. For example, if the server computer system 110 determines the expected response time for client system 102 to provide a proposed solution 124 for a particular challenge problem 120 to be 2500 ms, server computer system 10 may accept a measured response time that is within, e.g., 2000-3000 ms, but may determine that measured response times exceeding this threshold to be indicative that the client system 102 is an emulated computer system. Likewise, a measured response time falling significantly below this threshold may also indicate that the client is an emulated system (e.g. the client device may have much more compute power at its disposal than is apparent). Again, the times above are merely examples and a wide range of different times (and expected completion ranges) will correspond to different challenges in various embodiments. As one non-limiting example, if the detected technical features indicate that the client system is a smartphone but the measured response time is significantly shorter than the expected response time for a smartphone to solve the challenge problem 120, this may indicate that the client system 102 is actually an emulation of a smartphone that is running on a PC or cloud-based platform.

Note, however, that this embodiment is provided merely as an example and, in other embodiments, other aspects of client system 102 performance of challenge problem 120 may be used to determine whether it is an emulated computer system. For example, in some embodiments, such a determination may be based on whether the computational performance of the client system 102 matches that of other client systems with similar technical features, as discussed in more detail below with reference to FIG. 4. Further, as discussed in more detail below with reference to FIG. 2, the determination of whether client system 102 is an emulated computer system may be based on its ability to utilize client-side cache in generating the proposed solution 124 to the challenge problem 120, according to some embodiments.

After it determines whether client system 102 is an emulated computer system, server computer system 110 may generate and send an authentication indication 128 to the client system 102. In instances in which the requesting user is authenticated to the service 112, authentication indication 128 may be provided simply by providing the requesting user with access to the service 112. In instances in which the requesting user is not authenticated, however, indication 128 may include a message stating that the access request has been denied, a request for additional authentication operations to be performed, etc. As noted above, the detection of an emulated computer system may simply be one factor used to determine whether to authenticate a requesting user to the service 112. Further, in some embodiments, the detection of an emulated computer system may not necessarily result in the requesting user being denied access to the service 112. That is, it is possible for valid users to access their user accounts with service 112 using an emulated computer system, in at least some embodiments. Given their frequent use for malicious activity, however, the detection of an emulated computer system may trigger server computer system 110 to implement additional authentication or security challenges, in various embodiments.

Although the detection of emulated computer systems has been discussed with reference to server computer system 110 that provides the service 112, note that, in various embodiments, some or all of the disclosed authentication operations may be performed by a separate authentication server (e.g., instead of or in addition to being performed by server computer system 110).

Figure 2:
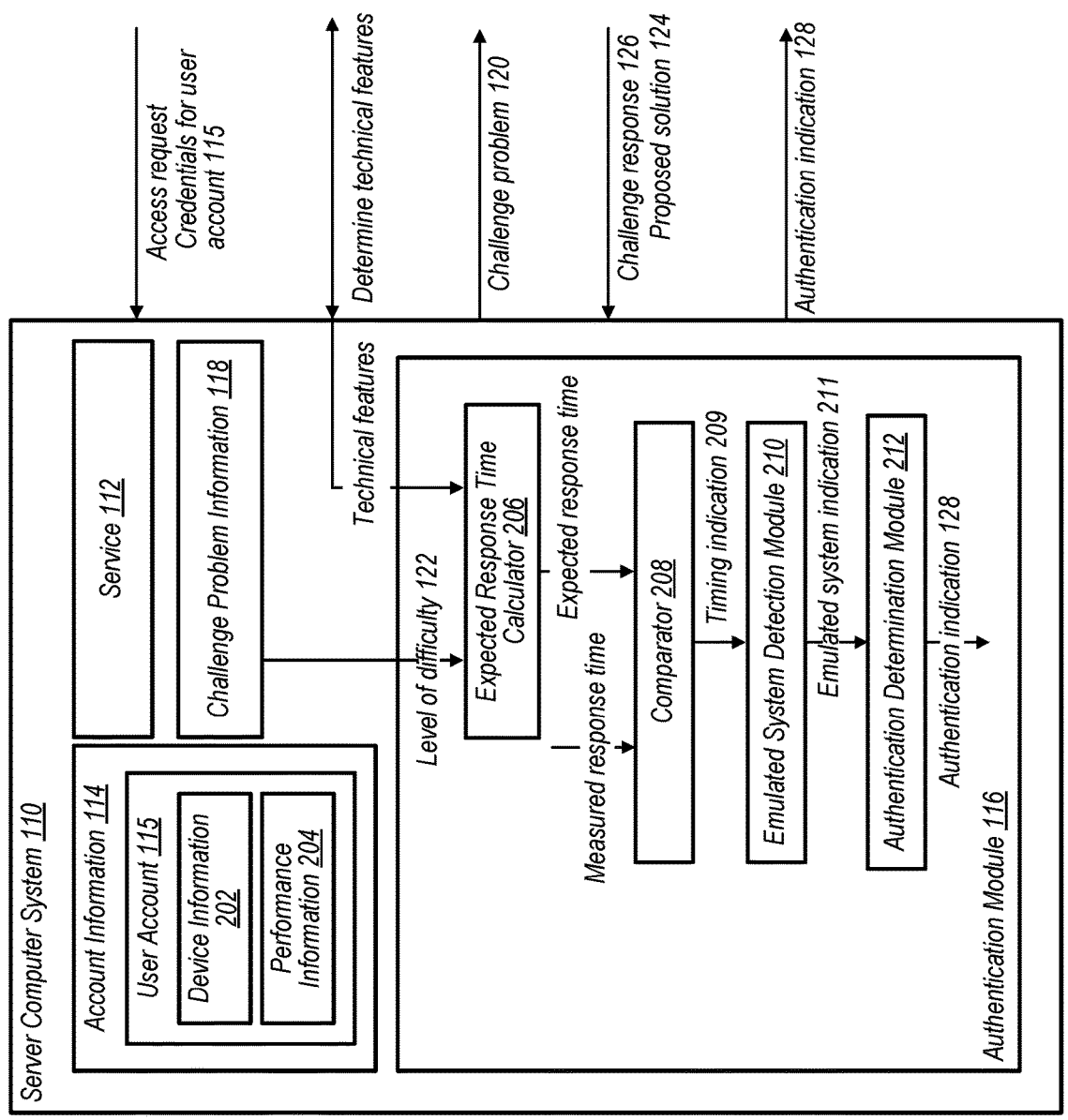
FIG. 2 is a block diagram illustrating an example server computer system, according to some embodiments.

Turning now to FIG. 2, a block diagram illustrating an example server computer system 110 is depicted, according to some embodiments. In various embodiments, server computer system 110 is operable to detect an emulated computer system based on its computational performance of one or more challenge problems.

In the depicted embodiment, server computer system 110 receives, from client system 102, a request to access user account 115 associated with the service 112. In various embodiments, the request may include authentication credentials specifying a username associated with account 115 and a password. These authentication credentials may be validated against stored credentials for account 115. Additionally, in some embodiments, server computer system 110 may perform other suitable authentication procedures, such as requiring the user to provide one or more additional authentication factors for verification (e.g., by providing a one-time passcode sent as an out-of-band message to a device associated with account 115, through a multi-factor authentication application, such as Google™ Authenticator, etc.).

In various embodiments, server computer system 110 is operable to detect various reported technical features associated with the client system 102 used by the requesting user, for example using device fingerprinting. Server computer system 110 may determine various different technical features associated with the client system 102, including the user agent string from the browser 108 (e.g., "Mozilla/5.0 (Windows NT 10.0; Win64; x64; rv:63.0) Gecko/20100101 Firefox/63.0"), the HTTP ACCEPT headers sent by the browser 108, the screen resolution of a display for system 102, current window size, browser extensions and plugins installed in the browser 108 (e.g., Java, Flash, Acrobat, etc.), the graphics driver, the fonts installed on the system, the time zone in which system 102 is located, the platform (e.g., Win32, Linux x86, etc.), the operating system 106, the amount of memory of system 102, the number of cores of a processor element of system 102, the system 102's language (e.g., en-US, etc.), the keyboard layout (e.g., by requiring the user to create an @ symbol, which, using a US-based keyboard will require a shift+2 operation (which can be observed via JavaScript), while pressing shift+2 on a Cyrillic keyboard would generate a double quote (") symbol instead), or any other suitable technical features.

In various embodiments, server computer system 110 may select, from challenge problem information 118, one or more challenge problems 120 to send to client system 102. As noted above, in various embodiments, server computer system 110 may select the challenge problem 120 from various challenge problems based on the technical features of the client system 102. For example, in some embodiments, challenge problem information 118 may include challenge problems that range in difficulty from relatively computationally easy to those that are more computationally intensive. In some embodiments, server computer system 110 may use the reported technical features of client system 102 to select a challenge problem having a level of difficulty that is commensurate with the reported technical capacity of client system 102. For example, if the detected technical features indicate that client system 102 is a more advanced computer system (e.g., relative to other systems), the server computer system 110 may select a more difficult challenge problem 120 to send to the client system 102. If, however, the detected technical features indicate that client system 102 is a less advanced computer system (e.g., using an older OS or web browser, etc.), server computer system 110 may select a less difficult challenge problem 120 to send. In other embodiments, however, each of the challenge problems in information 118 may be of the same, or substantially the same, level of difficulty, and server computer system 110 may select any of the challenge problems to send to client system 102, regardless of its reported technical features.

Note that, in some embodiments, rather than adjusting the level of difficulty 122 of the selected challenge problem 120 based on the client system 102's technical features, server computer system 110 may instead (or additionally) select multiple challenge problems for client system 102 to solve based on its technical features. For example, in some embodiments, the number of challenge problems selected may correspond to the technical features of the client system 102, with the number increasing as the technical capabilities of client system 102 increase. Further, in some embodiments, server computer system 110 may select the challenge problem 120 based on other factors, such as those indicative of a level of risk associated with the access request. For example, if the requesting user fits a profile more likely to abuse the service 112 (e.g., the request originated from certain IP ranges, certain geographic regions, includes certain types of requested transactions or access patterns, etc.), server computer system 110 may select a challenge problem 120 with a higher level of difficulty 122.

As noted above, in some embodiments, server computer system 110 may determine whether the client system 102 is an emulated computer system based on its ability to utilize client-side cache in generating a solution to the challenge problem 120. For example, in many instances, malicious third-parties will utilize light-weight, easily configurable "portable" browsers in attempting account takeovers. In many instances, however, portable browsers may be unable to store or retrieve data from a client-side cache (e.g., a browser cache of browser application 108). Accordingly, in some embodiments, server computer system 110 may determine whether the client system 102 is an emulated computer system—or simply whether to authenticate the requesting user to the service 112—based on the client 102's ability to use client-side cache. For example, in some embodiments, challenge problem 120 may include instructions for the client system 102 to retrieve, and subsequently refresh, a particular web page. For certain browser applications 108 (e.g. a browser that might exist on a typical desktop computer), it is expected that some or all of the data for the web page would be stored in browser cache when the web page was initially retrieved such that, when it is refreshed, some or all of that data would be loaded from cache rather than being requested again from the server computer system. If the browser application 108 is another type (e.g. a portable browser as might be found on certain mobile devices), however, it may lack the ability to store data on a client-side cache, and it may instead refresh the web page by requesting that the page be sent again. In various embodiments, server computer system 110 may monitor such behavior by the client system 102 and, if the client system 102 is unable to utilize a client-side cache, server computer system 110 may determine that is using a portable browser and that the user should not be authenticated.

In various embodiments, client system 102 may receive the challenge problem 120, generate a proposed solution 124, and provide back a challenge response 126 that includes the proposed solution 124. In various embodiments, authentication module 116 is operable to determine whether client system 102 is an emulated computer system—and whether to authenticate the requesting user to the account 115—based on the receipt of challenge response 126 and the proposed solution 124. For example, authentication module 116 includes expected response time calculator 206, which, in various embodiments, is operable to determine the expected response time to the challenge problem 120 for the client system 102. In the depicted embodiment, calculator 206 makes this determination based on both the technical features of the client system and the level of difficulty 122 of the challenge problem 120. In other embodiments, however, calculator 206 may calculate the expected response time based on either of these factors independent of the other. Further, as discussed above, in some embodiments, calculator 206 may consider network latency between the server computer system 110 and the client system 102 when determining the expected response time.

Authentication module 116 further includes comparator 208, which, in various embodiments, is operable to compare the expected response time to the measured response time, and generate a timing indication 209. Comparator 208, like other components depicted in this figure, may be implemented as stored computer executable instructions. In various embodiments, timing indication 209 may specify whether the measured response time was within a particular threshold of the expected response time, and may be used by emulated system detection module 210 to determine whether client system 102 is an emulated computer system. For example, if there is a significant discrepancy between the expected and measured response times (e.g., their difference exceeds some predetermined threshold, such as 25% of the expected response time), this discrepancy may indicate that the purported technical features of client system 102 do not match the actual technical features of the client system 102.

This, in turn, may indicate that the client system 102 is actually an emulated computer system. In some embodiments, emulated system detection module 210 may determine whether client system 102 is an emulated computer system based on other factors. For example, in some embodiments, emulated system detection module 210 may compare client system 102's computational performance of the challenge problem 120 with performance information 204—which may include information indicative of its previous performance of other challenge problems during previous authentication procedures—to determine whether its current computational performance is similar to that in the past. Further, in some embodiments, emulated system detection module 210 may make its determination by comparing the computational performance of client system 102 to data specifying the computational performance of other systems with similar technical features, as discussed in more detail with reference to FIG. 4. In various embodiments, emulated system detection module 210 may generate an indicator 211 specifying the outcome of this determination.

Authentication module 116 further includes authentication determination module 212, which, in various embodiments, is operable to determine whether to authenticate the requesting user of client system 102 to the account 115 of service 112. As discussed herein, authentication determination module 212 may make this determination based on any suitable combination of various factors. For example, in some embodiments, authentication determination module 212 may determine whether to authenticate the user of client system 102 based on whether the emulated system indication 211 indicates that the client system 102 is an emulated computer system. Further, in some embodiments, authentication determination module 212 may determine whether to authenticate the requesting user, as noted above, based on a validation of the authentication credentials provided by the user, a comparison of whether the reported technical features of client system 102 match device information 202, which stores technical features associated with the devices previously used to access user account 115, etc. In various embodiments, authentication determination module 212 may generate an authentication indication 128 specifying the outcome of this determination, which may be provided to client system 102 (as discussed above). Note that, in various embodiments, the timing indication 209, emulated system indication 211, and authentication indication 128 may be expressed as a Boolean value, numeric value, or in any other suitable format that specifies the outcome of the operation performed by the corresponding modules.

In some embodiments, server computer system 110 may send the client system 102 one or more additional challenge problems once the server computer system determines that the client system 102 is an emulated computer system. These additional challenges may be sent rather than notifying the system via an authentication indication 128 or simply denying access to the service 112, in some instances. For example, in some embodiments, after determining that the client system 102 is a malicious user attempting to access the service 112, server computer system 110 may select additional, computationally intensive challenge problems for the client system 102 to solve. In some such embodiments, these additional challenge problems may be computationally intensive or unsolvable such that, when it attempts to generate a proposed solution, the client system 102 may be required to perform vast amounts of computational work. Such embodiments may impair a malicious user's ability to launch continued account-takeover attacks at the service 112 or to use the system 102 for other purposes for a limited timeframe, according to some embodiments.

Further, in some embodiments, given the nature of the challenge problems provided by server computer system 110, it may not be readily apparent to the client system 102 that these additional challenge problems are any more computationally difficult (or unsolvable) than the earlier challenge problem 120. For example, in instances in which the challenge problems include a 15-puzzle, it is impossible to resolve the puzzle for half of the starting positions. Such a determination, however, cannot readily be made prior to attempting to solve the puzzle, according to some embodiments, resulting in the client system 102 performing a considerable amount of time attempting to generate a correct solution to the challenge problem. (Note that this embodiment is provided merely as one non-limiting example and various other challenge problems may be used, in various embodiments.) Accordingly, after determining that the client system 102 is a malicious third-party attempting to improperly access the account of another on the service 112, server computer system 110 may send an additional, unsolvable (or very computationally intensive) challenge problems to the client system 102 in an effort to impair the system 102's ability to improperly access the service 112.

Further note that, in some embodiments, server computer system 110 may perform operations to determine whether a client system 102 is an emulated computer system during the authentication process of every user session. In other embodiments, however, the disclosed systems and methods may instead be implemented selectively, for example in instances in which the user session is determined to be higher risk or fits a profile of a session likely to result in the abuse of service 112 (e.g., the request originated from certain IP ranges, certain geographic regions, includes certain types of requested transactions or access patterns, etc.) Additionally, in some embodiments, the disclosed systems and methods may be selectively implemented for those user sessions for which there are technical indicators that the client system 102 is an emulated computer system (such as those indicators noted above including, for example, the amount of memory, the number of CPU cores, the graphics driver used, the CPUID, the HV Bios Bit, etc.).

As discussed above, server computer system 110, in various embodiments, is operable to determine reported technical features associated with client system 102. In some instances, however, such reported technical features may not directly correspond to the actual technical features of the client system 102. For example, in some embodiments, client system 102 may be an emulated computer system that is configured to "resemble" a valid user's computer system, enabling a malicious user to circumvent existing device fingerprinting assessments. The following discussion, with reference to FIGS. 3A-3B, describes two example client systems that may be used to attempt to access a service 112 hosted by a server computer system 110.

Figure 3A:
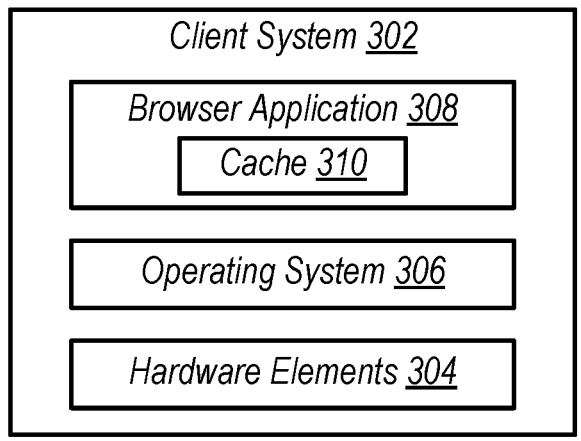
FIGS. 3A-3B are block diagrams illustrating example client systems, according to some embodiments.

FIG. 3A depicts a block diagram of an example client system 302 that corresponds to the actual, physical computer system of a valid user—with a valid user account 315—of the service 112. In FIG. 3A, client system 302 includes various hardware elements 304, OS 306, and browser application 308, which includes cache 310. Note that, in various embodiments, client system 302 may not be a new, pristine machine and, as such, may demonstrate signs of "aging," such as having data stored in a browser cache or system cache, having data stored in a swap space on a storage device of client system 302, etc. The particular technical features of a valid user's computer system may, of course, vary according to different embodiments. As one non-limiting embodiment, assume that client system 302 is an Apple iPhone™ that uses the iOS™ operating system 306 and the Safari™ browser application 308 to access service 112.

Figure 3B:
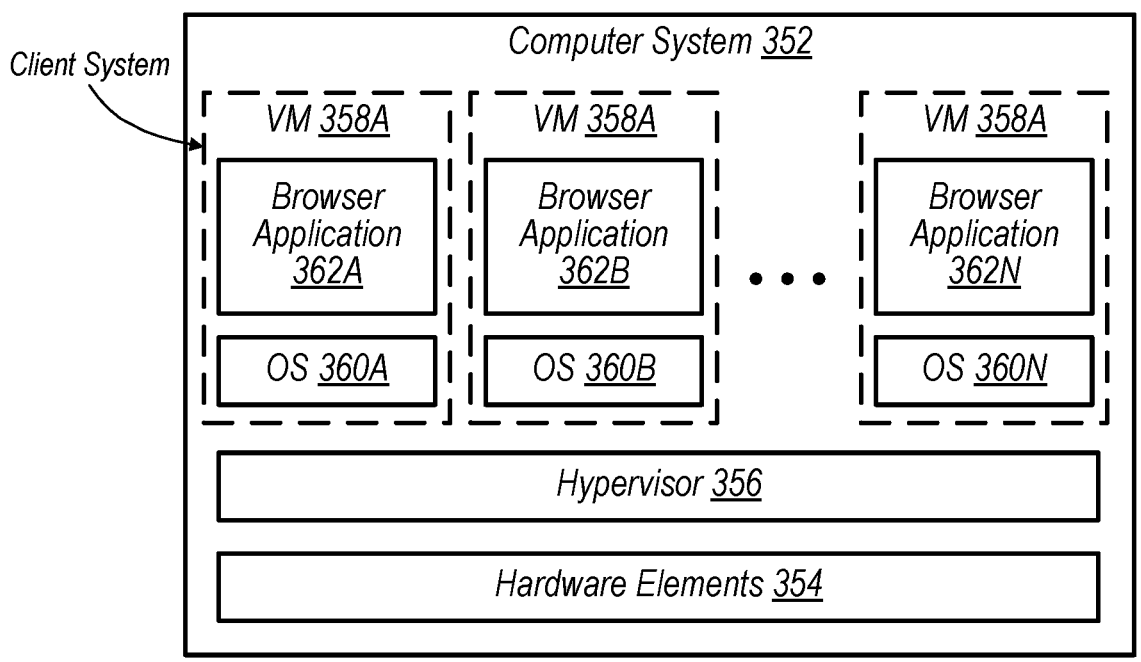

FIG. 3B, by comparison, depicts a block diagram of an example computer system 352 that is running multiple emulated computer systems simultaneously. In some embodiments, computer system 352 may correspond to a computing system used by a malicious user to attempt to improperly access a valid user's account (e.g., as part of an account takeover attack) with service 112. In FIG. 3B, computer system 352 includes various hardware elements 354, a hypervisor 356, and multiple virtual machines 358A-358N, each of which is an emulated computer system. Each of the VMs 358 include an OS 360 and a browser application 362. Note that, in various embodiments, each of the VMs 358 may be instantiated and "torn down" on an as-needed basis and, as such, may not exhibit the same signs of aging as client system 302. In various embodiments, the absence of such signs of aging may be considered an indicator that the client system is an emulated computer system. The presence or absence of such signs of machine aging may be determined, as discussed above, based on aspects of the computational performance of the client system as it generates proposed solutions for one or more challenge problems, such as its response time, caching behavior (e.g., ability to utilize client-side cache, the incidence of cache hits and misses, etc.), and various other characteristics that may be exposed during the generation of a proposed solution to a challenge problem.

As discussed herein, the emulated computer systems (e.g., VMs 358A-358N) used by the malicious third-party may be configured to have technical features that resemble those of a valid user's computer system. For example, assume that a malicious user of computer system 352 is attempting to access the user account 315 associated with the user of client system 302. In various embodiments, the malicious user may obtain information regarding the technical features of the valid user's client system 302 and may create a virtual machine with technical features that match. For instance, continuing with the example above, the malicious user may create a VM 358A that is an emulation of an Apple iPhone™, using the same iOS™ operating system 360A and the same Safari™ browser application 362A as the client system 302. The malicious user may then send a request, from the client system VM 358A, to the server computer system 110 to access the user account 315 for service 112. In prior systems, a server computer system using existing device fingerprinting techniques may be unable to detect that such an access request is coming from a system other than the valid user's actual system 302, or that the access request is coming from an emulated computer system. In various embodiments, however, the disclosed systems and methods may enable the server computer system 110 to detect that the request has originated from an emulated computer system (e.g., VM 358A), an indicator that the transaction or session is higher risk and that any of various appropriate actions may be taken. Note that, in some embodiments, the determination that an access request originated from an emulated computer system may be one factor (of multiple, possibly many, factors) used to weigh or assess the level of risk associated with a given transaction or session.

Note that, in the depicted embodiment, computer system 352 is running multiple VMs 358 simultaneously. In various embodiments, this may allow a malicious third-party to scale their attacks, attempting to access the service 112 using the multiple emulated computer systems at the same time. In some embodiments, each of the VMs 358 may be configured to attempt to access the same account (e.g., user account 315) with the same service (e.g., service 112). In other embodiments, however, the VMs 358 may be configured to attempt to access different accounts or different services. Further note that, although an emulated smartphone was discussed with reference to FIG. 3B, computer system 352 may implement various types of emulated computer systems, according to different embodiments, such as personal computers using any of various operating systems (e.g., including Windows™-based OS's, macOS™, or various Linux™-based OS distributions, etc.), mobile computing devices (e.g., smartphones, tablet computers, etc.), IoT devices, such as televisions, refrigerators, or other appliances, or any other suitable device capable of accessing service 112.

Figure 4:
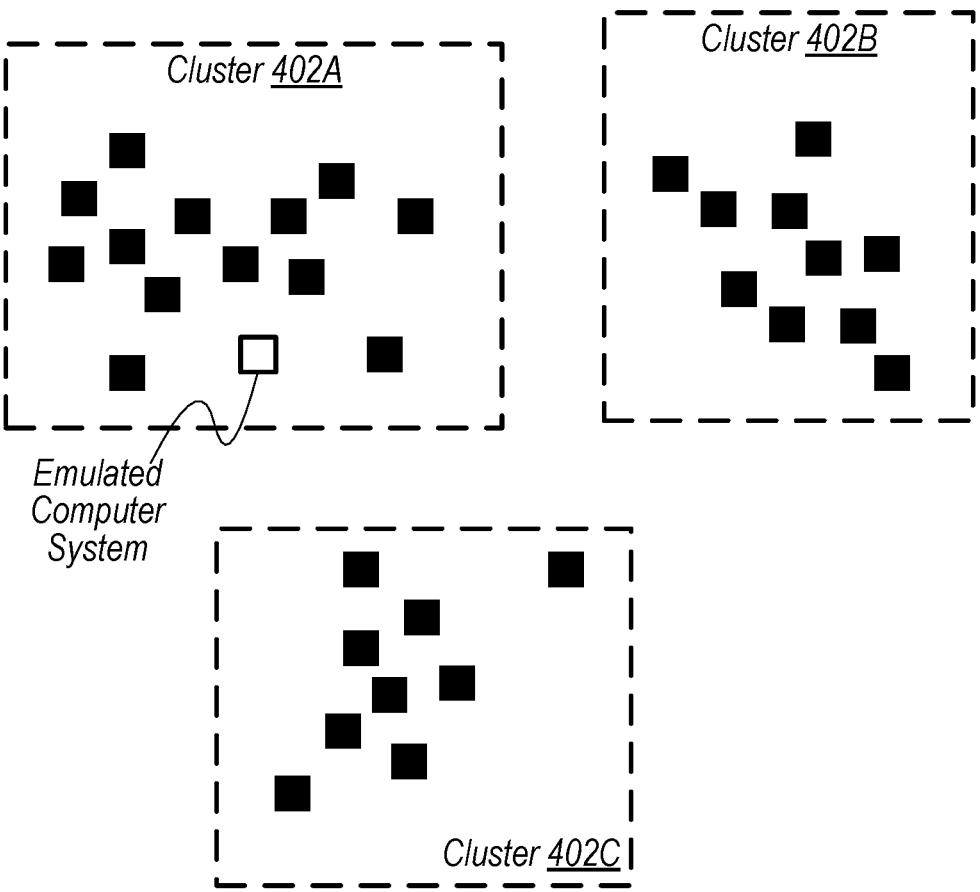
FIG. 4 is a block diagram illustrating a graphical representation of computational performance data, according to some embodiments.

Turning now to FIG. 4, a graphical depiction of computational performance data 400 is shown, according to some embodiments. In various embodiments, data 400 corresponds to the computational performance of previous challenge problems by various client systems as they attempt to access service 112. For example, in some embodiments, server computer system 110 may store information—such as measured and expected response times, reported technical features, type or difficulty of the challenge problems 120, whether the proposed solution was correct, caching behavior of the client 102, or any other of various performance metrics—corresponding to the computational performance of client systems 102 as they attempt to access service 112.

In FIG. 4, the computational performance of a given client system (measured using any suitable combination of performance metrics, such as those noted above) is denoted by a solid square, with the respective locations of the squares indicating the similarity of the computational performances relative to one another. In the depicted embodiment, data 400 includes three clusters 402 of similar computational performances. In various embodiments, server computer system 110 may use any of various suitable clustering algorithms to group the computational performances of its various client systems. For example, in some embodiments, server computer system 110 may perform iterations of affinity propagation operations to group the performance data into clusters 402. In other embodiments, for example, the server computer system 110 may use locality-sensitive hashing to perform such clustering. Further note that although only three clusters (i.e., clusters 402A-402C) are shown in FIG. 4, this simplified embodiment is provided merely as an example; in other embodiments, computational performance data 400 may include any suitable number of clusters.

In various embodiments, client systems with similar technical features may perform similarly when solving challenge problems provided by server computer system 110. That is, in some embodiments, client systems with similar technical features (e.g., the same or similar processor subsystems, amount of memory, operating system, browser application, etc.) may exhibit similar performance metrics when solving challenge problems 120. For example, two similar desktop computer systems may perform similarly (e.g., within some performance threshold) when generating proposed solutions 124 to challenge problems 120.

In various embodiments, however, client systems that do not have similar technical features (e.g., actual technical features, as opposed to simply having similar reported technical features), may perform differently (e.g., as measured by various performance metrics) when solving challenge problems provided by server computer system 110. Stated differently, in some embodiments, client systems that have actual technical features that are dissimilar may exhibit dissimilar performance metrics when solving challenge problems 120, even if their reported technical features are similar. Accordingly, while an emulated computer system may be configured to resemble a valid user's computer system, and indeed include some of the same technical features, the emulated computer system may still perform differently than the actual, physical computer system it is intended to mimic. Thus, in some embodiments, the computational performance of an emulated computer system may differ from the client system it is configured to resemble such that, when compared to the computational performance data 400, the emulated computer system will be associated with a different cluster than would be expected based solely on its reported technical features.

For instance, in continuing with the example described above with reference to FIGS. 3A-3B, assume that a malicious user sends a request to access the user account 315 using VM 358A of computer system 352. VM 358A, in the present example, may be configured to resemble the client system 302 of the valid user of account 315, such that VM 358A is an emulation of an Apple iPhone™, running iOS™ operating system 360A, and using the Safari™ browser application 362A. When it receives this access request, server computer system 110 may determine various technical features associated with VM 358A. Since VM 358A is configured to resemble the client system 302, however, server computer system 110 may detect many of the same technical features as system 302 and may be unable to determine that the request originated from a device other than client system 302. As discussed herein, server computer system 110 may select a challenge problem 120 and send it to the VM 358A. Once VM 358A generates a proposed solution 124 and provides it to the server computer system 110, system 110 may compare the performance of the challenge problem 120 by VM 358A to the computational performance data 400.

As noted above, various data models may be constructed from the performance data 400 based on any suitable combination of performance metrics. When the desired performance metrics of the computational performance by VM 358A are compared to the computational performance data 400, it may be determined that the VM 358A's performance—denoted in FIG. 4 as a blank square—does not match what would be expected based on its reported technical features. As one non-limiting example, assume that, in FIG. 4, cluster 402 is associated with modern, high-performance computer systems, cluster 402B is associated with mobile computing devices, such as smartphones and tablets, and cluster 402C is associated with older or lower-end computer systems. In this example, it would be expected, based on its reported technical features, that the performance of VM 358A would fit in or near cluster 402B. Given the differences between the actual technical features of VM 358A and client system 302, however, the performance of VM 358A instead fits more closely with cluster 402A. In various embodiments, such a discrepancy in computational performance may indicate that the actual technical features of the requesting client system (e.g., VM 358A, in the present example) do not match the reported technical features determined by the server computer system 110 (e.g., through device fingerprinting). In some embodiments, server computer system 110 may use this information in determining whether a requesting client system is an emulated computer system.

Note that, in some embodiments, in addition to comparing the computational performance of 358A to the computational performance data 400 for a larger group of client systems, server computer system 10 may also compare the computational performance of VM 358A to prior computational performance data for the client system 302 associated with user account 315.

Further note that, in addition to detecting emulated computer systems, various embodiments of the disclosed systems and methods may be used to detect a physical computer system that is being used (e.g., by a malicious third-party) to improperly access a valid user's account. For example, consider an instance in which a malicious user has gained access to a valid user's authentication credentials (e.g., username, password, cookie, etc.) and obtained information regarding the technical features of the valid user's client system. Rather than attempting to access the valid user's account via an emulated computer system that is configured to resemble the valid user's machine, the malicious user may instead attempt to replicate the valid user's machine using another, physical computer system. Stated differently, the malicious user may use a physical computer system with the same (or similar) technical features as the valid user's computer system in an attempt to bypass device fingerprinting assessments. In various embodiments, however, the disclosed systems and methods may still be able to detect that the malicious user's physical computer system is not the valid user's machine.

For example, as discussed above, server computer system 110 may store historical data 400 corresponding to the computational performance of previous challenge problems by the valid user's client system 102. Using such data, in some embodiments, the server computer system 110 may be able to predict how the valid user's client system 102 would be expected to perform during a given authentication attempt. For example, in some instances, the computational performance of the client 102 may be declining at a constant rate, for a particular class of challenge problems, or otherwise changing according to a pattern discernable through examination of the performance data 400. In such instances, even if the malicious user were to "replicate" the client system 102 (e.g., with the same hardware and software), it is unlikely that the malicious user's machine would be "aging" in the same manner as the client system 102. That is, if (due to changes in the hardware or software of client 102 caused by aging) client system 102's performance is trending in a certain way, it is very unlikely that the malicious user's machine—and therefore its computational performance—would also be changing in the same way. The server computer system 110, in various embodiments, may exploit this discrepancy by comparing the expected or projected performance for the client system 102 against the actual performance of the malicious user's physical machine. If the computational performance of the malicious user's machine falls outside of this range of expected performance, the server computer system 110 may take appropriate actions, such as denying access to the service 112 or requiring additional authentication operations be performed. As one non-limiting example of machine aging that may affect the computational performance of client system 102, dust buildup on the heatsink of the client 102 may cause the CPU to overheat and self-throttle, limiting computational performance. Other non-limiting examples include performance variations introduced due to software updates, cache hits/misses, etc.

Example Methods

Figure 5:
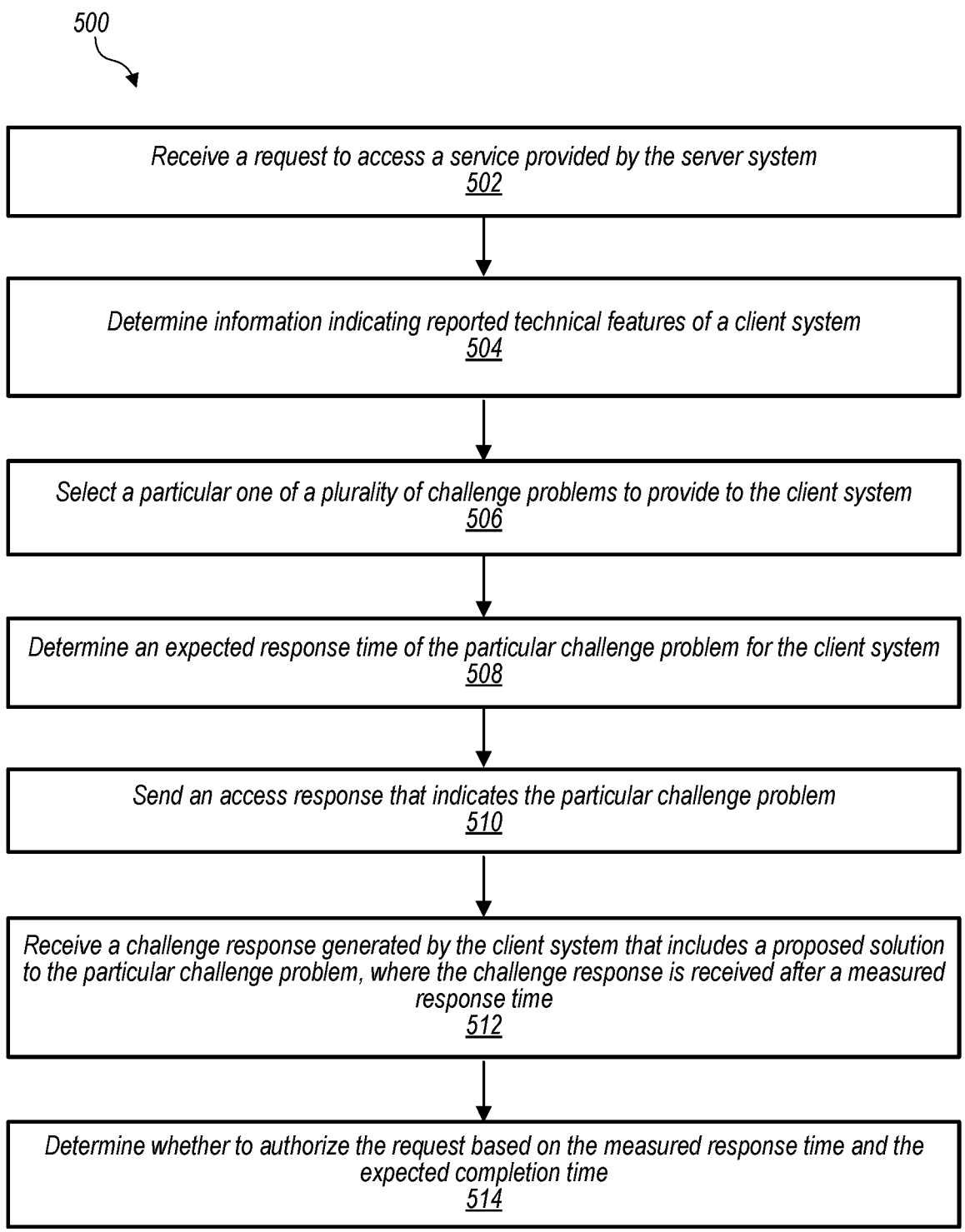
FIG. 5 is a flow diagram illustrating an example method for determining whether to authenticate a client system to a service based on its computational performance of a challenge problem, according to some embodiments.

Referring now to FIG. 5, a flow diagram illustrating an example method 500 for detecting an emulated computer system based on its computational performance of a challenge problem is depicted, according to some embodiments. In various embodiments, method 500 may be performed by server computer system 110 of FIG. 1 to determine whether client system 102 is an emulated computer system, and whether to authenticate a requesting user to the service 112. For example, server computer system 110 may include (or have access to) a non-transitory, computer-readable medium having program instructions stored thereon that are executable by the server computer system 110 to cause the operations described with reference to FIG. 5. In FIG. 5, method 500 includes elements 502-514. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the server computer system receives, from a client system, a request to access a service provided by the server computer system. In some embodiments, the request specifies credentials (e.g., username and password) for a user account associated with the service.

At 504, in the illustrated embodiment, the server computer system determines information indicating reported technical features of the client system. As noted above, the server computer system may determine information indicating various reported technical features of the client system. For example, in some embodiments, the reported technical features correspond to processing capabilities of the client system and includes at least one of an operating system of the client system, an amount of memory of the client system, or a number of cores of a processor subsystem of the client system. Further, in some embodiments, the reported technical features include at least one of a browser used to send the request, an operating system of the client system, or a graphics driver of the client system.

At 506, in the illustrated embodiment, the server computer system selects a particular one of a plurality of challenge problems to provide to the client system. In some embodiments, the particular challenge problem is associated with a particular level of difficulty. In some embodiments, the selecting includes selecting the particular challenge problem, from a plurality of challenge problems, based on the particular level of difficulty corresponding to the reported technical features of the client system.

At 508, in the illustrated embodiment, the server computer system determines an expected response time of the particular challenge problem for the client system. In some embodiments, this determination is based on the information indicating the reported technical features of the client system and the particular level of difficulty of the particular challenge problem. As noted above, in determining the expected response time, the server computer system 110 may take into consideration the network latency involved in the network through which client system 102 and server computer system 110 are communicating.

At 510, in the illustrated embodiment, the server computer system sends, to the client system, an access response that indicates the particular challenge problem. For example, as noted above, in some embodiments, server computer system 110 may send the challenge problem 120 to the client system 102 in the form of program code or script that specifies both the challenge problem and an algorithm to be used to generate a proposed solution 124. At 512, in the illustrated embodiment, the server computer system receives a challenge response generated by the client system that includes a proposed solution to the particular challenge problem, where the challenge response is received after a measured response time. In some embodiments, this measured response time corresponds to an actual completion time of the challenge problem by the client system.

At 514, in the illustrated embodiment, the server computer system determines whether to authorize the request based on the measured response time and the expected response time of the particular challenge problem by the client system. In some embodiments, determining whether to authorize the request is further based on a cache behavior of the client system as it performs the particular challenge problem. In some embodiments, the determining whether to authorize the request is based on prior performances of challenge problems by other client systems. For example, in some embodiments, the determining whether to authorize the request further includes comparing the measured response time to stored performance data indicative of prior performances, by a plurality of client systems, of prior challenge problems, where the plurality of client systems includes a subset that have technical features similar to the reported technical features of the client system. Additionally, in some embodiments, determining whether to authorize the request further includes verifying the proposed solution to the particular challenge problem against an actual solution to the particular challenge problem.

In some embodiments, method 500 further includes retrieving, based on the credentials specified in the request, device profile information associated with the user account, and the determining whether to authorize the request includes comparing the reported technical features to the device profile information associated with the client system. Further, in some embodiments, method 500 may include, in response to determining that the client system is an emulated computer system, subsequently providing, to the client system, a computationally intensive challenge problem associated with a high level of difficulty.

Figure 6:
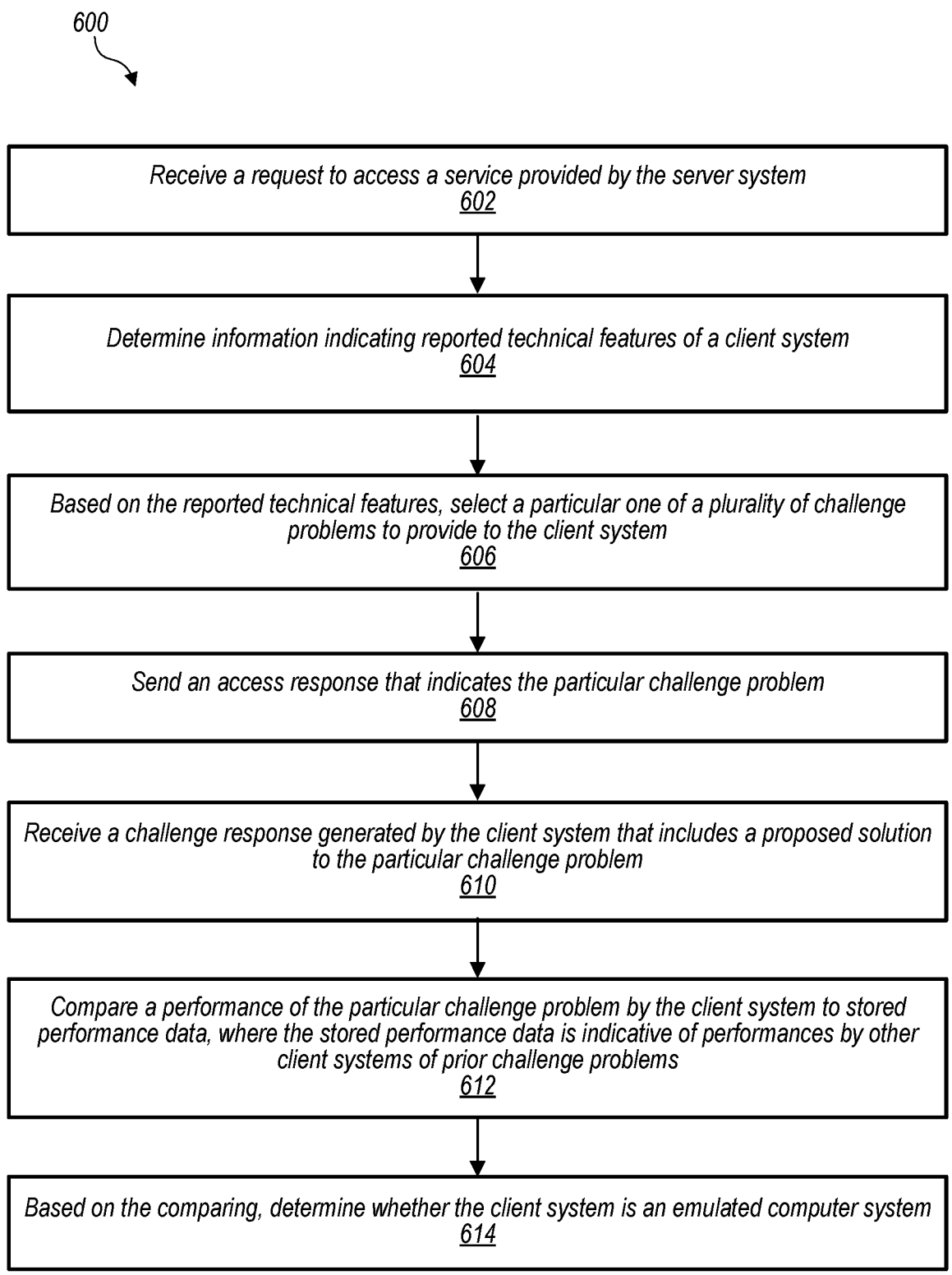
FIG. 6 is a flow diagram illustrating an example method for detecting an emulated computer system based on its computational performance of a challenge problem, according to some embodiments.

Turning now to FIG. 6, a flow diagram illustrating an example method 600 for detecting an emulated computer system based on its computational performance of a challenge problem is depicted, according to some embodiments. In various embodiments, method 600 may be performed by server computer system 110 of FIG. 1 to determine whether client system 102 is an emulated computer system, and whether to authenticate a requesting user to the service 112. For example, server computer system 110 may include (or have access to) a non-transitory, computer-readable medium having program instructions stored thereon that are executable by the server computer system 110 to cause the operations described with reference to FIG. 6. In FIG. 6, method 600 includes elements 602-614. While these elements are shown in a particular order for ease of understanding, other orders may be used. In various embodiments, some of the method elements may be performed concurrently, in a different order than shown, or may be omitted. Additional method elements may also be performed as desired.

At 602, in the depicted embodiment, the server computer system receives a request to access a service (e.g., service 112) provided by the server computer system. For example, with reference to the example discussed in FIGS. 3-4, server computer system 110 may receive a request, from a VM 358A, to access a user account 315 with service 112. At 604, the server computer system determines information indicating reported technical features of the client system. For instance, in this running example, server computer system 110 may determine reported technical features associated with VM 358A, including its OS 360A (e.g., iOS™) and its browser application 362A (e.g., Safari™).

At 606, in the depicted embodiment, the server computer system selects, based on the reported technical features, a particular one of a plurality of challenge problems to provide to the client system, and at 608, the server computer system sends an access response, to the client system, that indicates the particular challenge problem. For example, as discussed above, server computer system 110 may select a challenge problem 120 that is associated with a level of difficulty 122. In some embodiments, server computer system 110 may select the challenge problem 120, from a plurality of challenge problems, such that it has a level of difficulty that corresponds to the reported technical features of the requesting client system 102 (e.g., VM 358A, in the present example).

At 610, in the depicted embodiment, the server computer system receives a challenge response generated by the client system that includes a proposed solution to the particular challenge problem. At 612, in the depicted embodiment, the server computer system compares a performance of the particular challenge problem by the client system to stored performance data, where the stored performance data is indicative of performances by other client systems of prior challenge problems. For example, server computer system 110 may compare various performance metric of VM 358A's performance of the challenge problem 120 against the computational performance data 400 of FIG. 4. In some embodiments, computational performance data 400 may include clusters 402 of similar computational performances, which are correspondingly based on performances by similar computer systems. In some embodiments, element 612 may include comparing the performance of VM 358A to the data 400 to determine which, if any, of the clusters 402 the performance by VM 358A most closely matches.

At 614, in the depicted embodiment, the server computer system determines whether the client system is an emulated computer system based on the comparing at 612. For example, server computer system 110 may determine that the VM 358A is an emulated computer system after determining that its performance of the challenge problem 120 does not match performances by other iPhones™ in cluster 402B (which, based on the reported technical features, it should) but instead more closely matches the performances in cluster 402A, which corresponds to high-performance personal computer systems.

As noted above, in some embodiments the particular challenge problem may include instructions operable to expose the cache capabilities of the client system. For example, in some embodiments, the particular challenge problem instructs the client system to retrieve, and subsequently refresh, a particular web page. In some such embodiments, the determining whether the client system is an emulated computer system may be based on a cache behavior of the client system during the subsequently refreshing the particular web page.

In some embodiments, determining whether the client system is an emulated computer system is further based on a measured response time of the client system. For example, in some embodiments, the challenge response is received, from the client system, after a measured response time that corresponds to an actual completion time of the particular challenge problem by the client system. In some such embodiments, method 600 further includes determining an expected completion time of the particular challenge problem for the client system, where the determining the expected completion time is based on the information indicating the reported technical features of the client system and the particular level of difficulty of the particular challenge problem. Further, in some such embodiments, determining whether the client system is an emulated computer system is based on a comparison of the measured response time with the expected completion time.

Further, in some embodiments, determining whether the client system is an emulated computer system is based on previous performances of challenge problems by computer systems associated with the user account in question. For example, in some embodiments, the request to access the service includes credentials for a user account associated with the service, and method 600 further includes retrieving information corresponding to previous performances of challenge problems by client systems associated with the user account, and the determining whether the client system is an emulated computer system includes comparing the performance of the particular challenge problem by the client system to the previous performances.

Example Computer System

Figure 7:
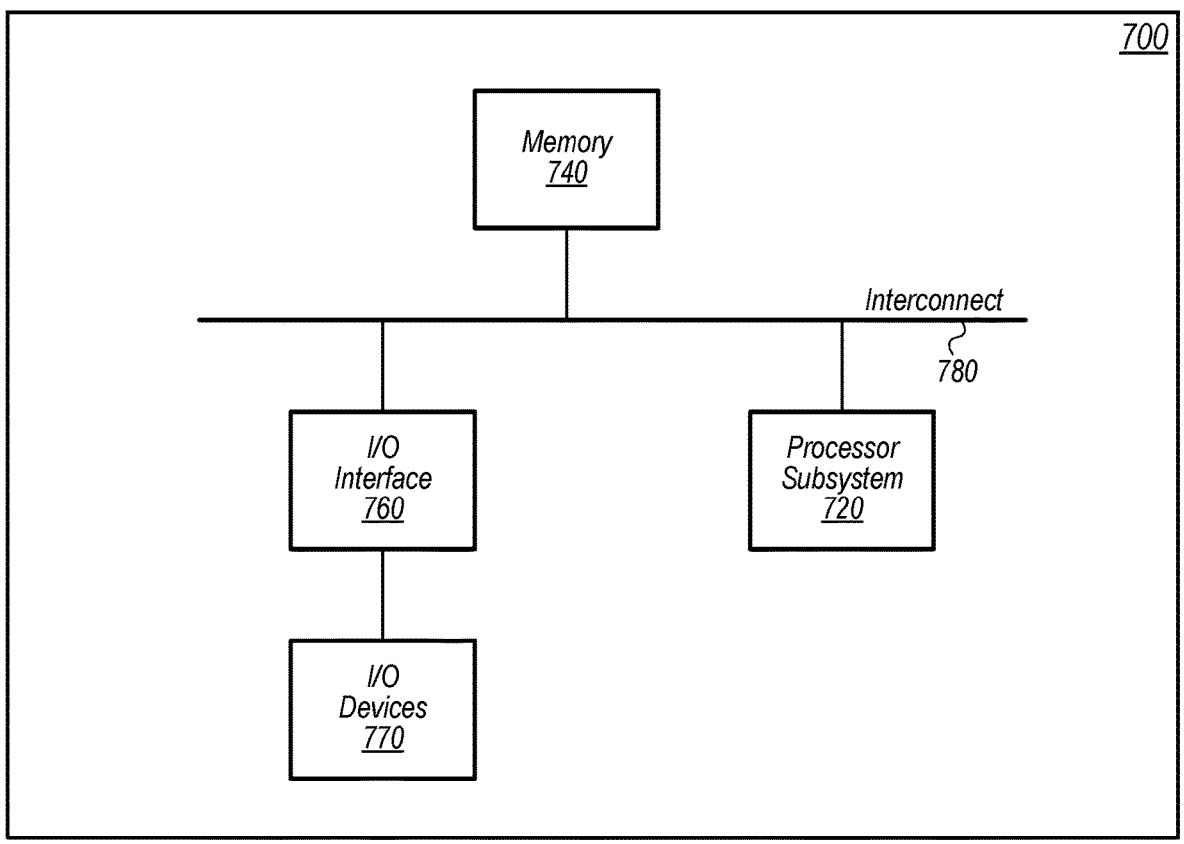
FIG. 7 is a block diagram illustrating an example computer system, according to some embodiments.

Referring now to FIG. 7, a block diagram of an example computer system 700 is depicted, which may implement one or more computer systems, such as client system 102 or server computer system 110 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., authentication module 116, expected response time calculator 206, comparator 208, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a server computer system from a client system, a request to access a service provided by the server computer system, wherein the request specifies credentials for a user account associated with the service;
   determining, by the server computer system, information indicating reported technical features of the client system;
   selecting, by the server computer system, a particular one of a plurality of challenge problems to provide to the client system, wherein the selecting the particular challenge problem is based on the reported technical features of the client system such that a particular level of difficulty of the particular challenge problem corresponds to the reported technical features of the client system;
   determining, by the server computer system, an expected response time of the particular challenge problem for the client system, wherein the determining is based on the information indicating the reported technical features of the client system and the particular level of difficulty of the particular challenge problem;
   sending, by the server computer system to the client system, an access response that indicates the particular challenge problem;
   receiving, by the server computer system, a challenge response generated by the client system that includes a proposed solution to the particular challenge problem, wherein the challenge response is received after a measured response time and corresponds to an actual completion time of the challenge problem by the client system; and
   determining, by the server computer system, whether to authorize the request based on the measured response time and the expected response time of the particular challenge problem for the client system.

2. The method of claim 1, wherein the particular challenge problem is designed to test an ability of the client system to utilize a browser cache of a browser application on the client system; and wherein the determining whether to authorize the request is further based on a cache behavior of the client system as the client system performs the particular challenge problem.

3. The method of claim 1, further comprising:
retrieving, by the server computer system based on the credentials specified in the request, device profile information associated with the user account; and
wherein the determining whether to authorize the request includes comparing the reported technical features of the client system to the device profile information associated with the client system.

4. The method of claim 1, wherein the determining whether to authorize the request further includes:
comparing, by the server computer system, the measured response time to stored performance data indicative of prior performances, by a plurality of client systems, of prior challenge problems, wherein the plurality of client systems includes a subset of client system that have technical features similar to the reported technical features of the client system.

5. The method of claim 4, wherein the determining whether to authorize the request further includes:
based on the information indicating the reported technical features of the client system, verifying, by the server computer system, whether a performance of the particular challenge problem by the client system is similar to the prior performances of the prior challenge problems by the subset of client systems.

6. The method of claim 1, wherein the reported technical features correspond to processing capabilities of the client system and includes at least one of an operating system of the client system, an amount of memory of the client system, or a number of cores of a processor subsystem of the client system.

7. The method of claim 1, wherein the determining whether to authorize the request further includes:
verifying the proposed solution to the particular challenge problem against an actual solution to the particular challenge problem.

8. The method of claim 1, further comprising:
determining, by the server computer system based on the measured response time, that the client system is an emulated computer system; and
subsequently providing, by the server computer system to the client system, a computationally intensive challenge problem associated with a high level of difficulty.

9. A non-transitory, computer-readable medium having instructions stored thereon that are capable of execution by a server computer system to perform operations comprising:
receiving, from a client system, a request to access a service provided by the server computer system, wherein the request specifies credentials for a user account associated with the service;
determining information indicating reported technical features of the client system;
selecting a particular one of a plurality of challenge problems to provide to the client system, wherein the selecting the particular challenge problem is based on the reported technical features of the client system such that a particular level of difficulty of the particular challenge problem corresponds to the reported technical features of the client system;
determining an expected response time of the particular challenge problem for the client system, wherein the determining is based on the information indicating the reported technical features of the client system and the particular level of difficulty of the challenge problem;
sending, to the client system, an access response that indicates the particular challenge problem;
receiving a challenge response generated by the client system that includes a proposed solution to the particular challenge problem, wherein the challenge response is received after a measured response time; and
determining whether to authorize the request based on the measured response time and the expected response time of the particular challenge problem for the client system.

10. The non-transitory, computer-readable medium of claim 9, wherein the particular challenge problem is designed to test an ability of the client system to utilize a browser cache of a browser application on the client system; and wherein the determining whether to authorize the request is further based on a cache behavior of the client system as the client system performs the particular challenge problem.

11. The non-transitory, computer-readable medium of claim 9, wherein the operations further comprise:
retrieving, based on the credentials specified in the request, device profile information associated with the user account; and
wherein the determining whether to authorize the request includes comparing the reported technical features of the client system to the device profile information associated with the client system.

12. The non-transitory, computer-readable medium of claim 9, wherein the determining whether to authorize the request further includes:
comparing, by the server computer system, the measured response time to stored performance data indicative of prior performances, by a plurality of client systems, of prior challenge problems, wherein the plurality of client systems includes a subset of client system that have technical features similar to the reported technical features of the client system.

13. The non-transitory, computer-readable medium of claim 12, wherein the determining whether to authorize the request further includes:
based on the information indicating the reported technical features of the client system, verifying, by the server computer system, whether a performance of the particular challenge problem by the client system is similar to the prior performances of the prior challenge problems by the subset of client systems.

14. The non-transitory, computer-readable medium of claim 9, wherein the reported technical features include at least one of a browser used to send the request, an operating system of the client system, or a graphics driver of the client system.

15. The non-transitory, computer-readable medium of claim 9, wherein the operations further comprise:
determining, by the server computer system based on the measured response time, that the client system is an emulated computer system; and
subsequently providing, by the server computer system to the client system, a computationally intensive challenge problem associated with a high level of difficulty.

16. A method, comprising:
receiving, by a server computer system from a client system, a request to access a service provided by the server computer system;
determining, by the server computer system, information indicating reported technical features of the client system;

based on the reported technical features of the client system, selecting, by the server computer system, a particular one of a plurality of challenge problems to provide to the client system, wherein the selecting the particular challenge problem is based on the reported technical features of the client system such that a particular level of difficulty of the particular challenge problem corresponds to the reported technical features of the client system;

sending, by the server computer system to the client system, an access response, wherein the access response indicates the particular challenge problem;

receiving, by the server computer system, a challenge response generated by the client system that includes a proposed solution to the particular challenge problem;

comparing, by the server computer system, a performance of the particular challenge problem by the client system to stored performance data, wherein the stored performance data is indicative of performances by other client systems of prior challenge problems, wherein the stored performance data includes a plurality of clusters of similar computing devices; and based on the comparing, determining, by the server computer system, whether the client system is an emulated computer system.

17. The method of claim 16, wherein the particular challenge problem is designed to test the ability of the client system to utilize a browser cache of a browser application on the client system, including by instructing the client system to retrieve, and subsequently refresh, a particular web page; and wherein the determining whether the client system is an emulated computer system is further based on a cache behavior of the client system during the subsequently refreshing the particular web page.

18. The method of claim 16, wherein the challenge response is received after a measured response time and corresponds to an actual completion time of the particular challenge problem by the client system, wherein the method further comprises:

determining, by the server computer system, an expected completion time of the particular challenge problem for the client system, wherein the determining the expected completion time is based on the information indicating the reported technical features of the client system and the particular level of difficulty of the particular challenge problem; and wherein the determining whether the client system is an emulated computer system is further based on a comparison of the measured response time with the expected completion time.

19. The method of claim 16, wherein the request to access the service includes credentials for a user account associated with the service, wherein the method further comprises:

retrieving, by the server computer system, information corresponding to previous performances of challenge problems by client systems associated with the user account; and wherein the determining whether the client system is an emulated computer system includes comparing the performance of the particular challenge problem by the client system to the previous performances.

\* \* \* \* \*